(12) United States Patent
Guo et al.

(10) Patent No.: US 10,810,742 B2
(45) Date of Patent: Oct. 20, 2020

(54) DYNAMIC AND STATIC IMAGE PROCESSING METHOD AND SYSTEM

(71) Applicant: Tencent Technology (Shenzhen) Company Limited, Shenzhen, Guangdong (CN)

(72) Inventors: Antai Guo, Guangdong (CN); Deqiang Jiang, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 112 days.

(21) Appl. No.: 15/949,719

(22) Filed: Apr. 10, 2018

(65) Prior Publication Data

US 2018/0225828 A1  Aug. 9, 2018

Related U.S. Application Data

(63) Continuation of application No. PCT/CN2017/083583, filed on May 9, 2017.

(30) Foreign Application Priority Data

May 9, 2016 (CN) .......................... 2016 1 0302568

(51) Int. Cl.
*G06T 7/11* (2017.01)
*G06K 9/32* (2006.01)
(Continued)

(52) U.S. Cl.
CPC ............ *G06T 7/11* (2017.01); *G06K 9/00228* (2013.01); *G06K 9/2081* (2013.01);
(Continued)

(58) Field of Classification Search
CPC ............. G06K 9/00228; G06K 9/3233; G06K 9/6271; G06K 9/4628; G06K 9/2081;
(Continued)

(56) References Cited

U.S. PATENT DOCUMENTS 5,181,171 A * 1/1993 McCormack .......... G01V 1/288
702/14
5,732,697 A * 3/1998 Zhang ................... G06T 7/0012
600/300

(Continued)

FOREIGN PATENT DOCUMENTS

CN    101046880 A    10/2007
CN    101308571 A    11/2008
(Continued)

OTHER PUBLICATIONS

Long et al, "Fully convolutional networks for semantic segmentation" (Year: 2015).*
(Continued)

*Primary Examiner* — Kenny A Cese
(74) *Attorney, Agent, or Firm* — Brinks Gilson & Lione

(57) ABSTRACT

This disclosure provides an image processing method and processing system. The method includes obtaining an image and selecting a calibration area of the image. The method also includes reading a feature parameter corresponding to the calibration area from a preset segmentation model. The method further includes segmenting the image by using the feature parameter, to generate a segmentation result corresponding to the calibration area. This image segmentation by using the feature parameter obtained from the segmentation model provides a high accuracy segmentation rate and can be applied in wide scenarios.

14 Claims, 8 Drawing Sheets

(51) Int. Cl.
*G06K 9/00* (2006.01)
*G06K 9/62* (2006.01)
*G06K 9/42* (2006.01)
*G06K 9/46* (2006.01)
*G06N 3/08* (2006.01)
*G06N 3/04* (2006.01)
*G06K 9/20* (2006.01)
*G06T 11/60* (2006.01)

(52) U.S. Cl.
CPC ......... *G06K 9/3233* (2013.01); *G06K 9/4628* (2013.01); *G06K 9/6271* (2013.01); *G06K 9/6277* (2013.01); *G06K 9/6298* (2013.01); *G06N 3/04* (2013.01); *G06N 3/0454* (2013.01); *G06N 3/08* (2013.01); *G06N 3/084* (2013.01); *G06T 11/60* (2013.01); *G06T 2200/24* (2013.01); *G06T 2207/20081* (2013.01); *G06T 2207/20084* (2013.01); *G06T 2207/30201* (2013.01)

(58) Field of Classification Search
CPC ............... G06K 9/6277; G06K 9/6298; G06T 2207/20081; G06T 2207/20084; G06T 7/11
See application file for complete search history.

(56) References Cited

U.S. PATENT DOCUMENTS

| | | | | |
|---|---|---|---|---|
| 2008/0002862 | A1* | 1/2008 | Matsugu | G06K 9/00248 382/115 |
| 2016/0012330 | A1* | 1/2016 | Pescianschi | G06N 3/084 706/25 |
| 2016/0086304 | A1* | 3/2016 | Hsieh | G06K 9/00281 382/201 |
| 2016/0253814 | A1* | 9/2016 | Fathi | G06T 7/579 382/154 |
| 2017/0015317 | A1* | 1/2017 | Fasola | B60W 40/10 |
| 2017/0161545 | A1* | 6/2017 | Champlin | G06K 9/0014 |
| 2017/0185872 | A1* | 6/2017 | Chakraborty | G06K 9/6267 |
| 2017/0236286 | A1* | 8/2017 | Fanello | G06K 9/627 382/154 |
| 2017/0249744 | A1* | 8/2017 | Wang | G06T 1/60 |

FOREIGN PATENT DOCUMENTS

| | | | |
|---|---|---|---|
| CN | 102436636 | A | 5/2012 |
| CN | 102436637 | A | 5/2012 |
| CN | 102609958 | A | 7/2012 |
| CN | 102831396 | A | 12/2012 |
| CN | 104123749 | A | 10/2014 |
| CN | 105354565 | A | 2/2016 |
| CN | 106022221 | A | 10/2016 |

OTHER PUBLICATIONS

Long et al., "Fully Convolutional Networks for Semantic Segmentation" (Year: 2014).*

Song, Bo, "Tsinghua University Press," Mastering Photoshop Acquiring—Figure 8 Core Techniques, Jun. 30, 2014, pp. 351-352.

Jia, Yangqing et al., "Caffe: Convolutional Architecture for Fast Feature Embedding," Proceeding MM '14 Proceedings of the 22$^{nd}$ ACM International Conference on Multimedia, Nov. 7, 2014, pp. 675-678.

An arXiv copy dated Mar. 8, 2015 submitted for Long, Jonathan et al., "Fully Convolutional Networks for Semantic Segmentation," The IEEE Conference on Computer Vision and Pattern Recognition (CVPR), 2015, Dec. 31, 2015, pp. 1-10.

Office Action with concise English Translation dated Nov. 5, 2018 for Chinese Application No. 201610302568.8, 11 pages.

Second Office Action with concise English Translation dated Feb. 19, 2019 for Chinese Application No. 201610302568.8, 7 pages.

International Search Report and Written Opinion dated Aug. 14, 2017 for PCT Application No. PCT/CN2017/083583, 12 pages.

* cited by examiner

DYNAMIC AND STATIC IMAGE PROCESSING METHOD AND SYSTEM

RELATED APPLICATION

This application is a continuation application of PCT Patent Application No. PCT/CN2017/083583, filed on May 9, 2017, which claims priority to Chinese Patent Application No. 201610302568.8, filed with the Chinese Patent Office on May 9, 2016 and entitled "IMAGE PROCESSING METHOD AND PROCESSING SYSTEM", both of which are incorporated herein by reference in their entireties.

FIELD OF THE TECHNOLOGY

This disclosure belongs to an image processing field, and in particular, to an image processing method and processing system.

BACKGROUND OF THE DISCLOSURE

Hair plays a vital role in an overall image of people, thereby drawing increasing attention in recent years. In disclosures of photographing, image beautification and social platform, and the like, hair segmentation usually becomes one of the top priorities.

Currently, a face location is performed by using a face detection technology, after which estimation is performed on a hair area, and probability of each pixel belonging to the hair area is calculated according to a hair color and the like. Finally, segmentation is performed on global hair based on location information and color probability.

In the above hair segmentation method, in the first step of locating a face, an algorithm thereof extremely depends on a geometrical position of the face and integrity of the face. Therefore, a problem exists that locating a side face or locating a face in an image of a partially-covered face can easily fail, thereby reducing an accuracy rate of the location.

In the second step of estimating a hair area, due to a large diversity of a hair shape distribution and a variety of hair styles, such as long hair, short hair, or loose hair, a problem exists with unstable statistical information on the hair area, thereby reducing an accuracy rate of the estimation.

In the third step of probability calculating with using statistical information of a hair color, because the hair color also has a wide distribution feature, and the like, for different human species and diversities of hair dye colors, a problem exists that hair color statistical information has low reliability, thereby reducing an accuracy rate of the probability calculation.

Using the above image processing technology, and performing a serial processing on the above several steps, error rates in all steps are accumulated, thus reducing an accuracy rate and resulting in a poor robustness. This disclosure is used to improve the computer-related image processing technology by solving the above existing problems.

SUMMARY

An embodiment of this disclosure provides an image processing method. The method includes obtaining, by a first device comprising a first memory and a first processor in communication with the first memory, an image; and selecting, by the first device, a calibration area of the image. The method also includes obtaining, by the first device from a segmentation model, a feature parameter corresponding to the calibration area. The method further includes segmenting, by the first device, the image by using the feature parameter, to generate a segmentation result corresponding to the calibration area.

An embodiment of this disclosure provides an image processing system. The system includes a memory storing instructions and a processor in communication with the memory. When the processor executes the instructions, the processor is configured to cause the system to obtain an image and select a calibration area of the image. When the processor executes the instructions, the processor is configured to further cause the system to obtain, from a segmentation model, a feature parameter corresponding to the calibration area; and segment the image by using the feature parameter, to generate a segmentation result corresponding to the calibration area.

An embodiment of the present disclosure further provides a non-transitory computer readable storage medium storing instructions. The instructions, when executed by a processor, cause the processor to obtain an image and select a calibration area of the image. The instructions, when executed by a processor, cause the processor to obtain, from a segmentation model, a feature parameter corresponding to the calibration area; and segment the image by using the feature parameter, to generate a segmentation result corresponding to the calibration area.

The image processing method and processing system provided in the embodiments of this disclosure, using the feature parameter obtained from the segmentation model, to segment the image, so as to generate the segmentation result corresponding to the calibration area. Deep learning, through which the segmentation model is obtained, and the segmentation model of which has a great robustness, has a high accuracy rate to perform segmentation by using the segmentation model, thereby applying to wide scenarios.

BRIEF DESCRIPTION OF THE DRAWINGS

To describe the technical solutions in the embodiments of this disclosure or in the prior art more clearly, the following briefly introduces the accompanying drawings required for describing the embodiments or the prior art. Apparently, the accompanying drawings in the following description show merely the embodiments of this disclosure, and a person of ordinary skill in the art may still derive other drawings from these accompanying drawings without creative efforts.

DESCRIPTION OF EMBODIMENTS

The following describes the technical solutions in the embodiments of this disclosure with reference to the accompanying drawings in the embodiments of this disclosure. Apparently, the described embodiments are some embodiments of this disclosure rather than all of the embodiments.

All other embodiments obtained by persons skilled in the art based on the embodiments of this disclosure without creative efforts shall fall within the protection scope of this disclosure.

Principles of the present disclosure are illustrated for implementing in an applicable operation environment. The following description is based on the illustrated specific embodiments of this disclosure, which should not be construed as limiting other specific embodiments not discussed in detail herein.

The principles of the present disclosure described herein do not represent a limitation. A person skilled in the art shall know that multiple steps and operations described below can be implemented in software as well as in hardware. The principles of the present disclosure are operational with numerous other general purpose or special purpose computing or communication environments or configurations.

Figure 1:
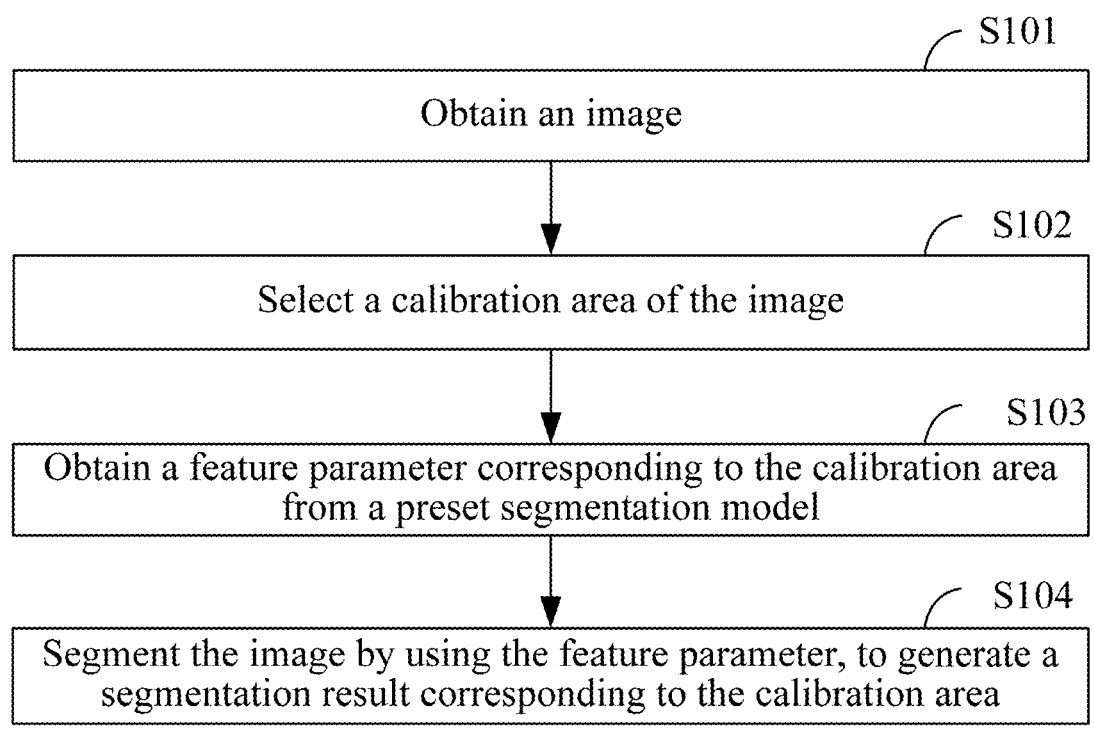
FIG. 1 is a schematic flow chart of an image processing method according to an embodiment of this disclosure.

FIG. 1 is a schematic flow chart of an image processing method according to an embodiment of this disclosure. The image processing method can be executed in a terminal, or a server.

The image processing method includes the following steps S101 to S104:

In step S101, obtaining an image.

Figure 5A:
FIGS. 5A, 5B, 5C, and 5D are schematic diagrams of a training image, a calibration image, a test image, and a segmentation result provided in an embodiment of this disclosure separately.
Figure 5B:
Figure 5C:

The image includes but is no limited to an image of a person, scenery, an object, or the like. An image of at least one person is used as an example below, and the disclosure is not limited to an image of at least one person. An image as shown in FIG. 5C includes at least a head. The person image may be a half-length portrait or a full-length portrait, a frontal portrait or a side face portrait; an individual portrait or a group portrait, or the like.

In step S102, selecting a calibration area of the image.

Use an example in which hair is selected as the calibration area to explain. Other part of the image may be selected as the calibration area, for example and not limited to, a beard, an eyebrow, an eye, a nose, a mouth, clothes, or a pair of glasses, or the like.

In an implementation, selecting the calibration area of the image may includes the following steps:

(1) Tapping in the image to obtain a tap point, extract a feature from the tapped point, and extend to an area comprising a second feature similar to the feature, to generate the calibration area. For example, select at least any point in a hair area in the image shown in FIG. 5C; or (2) Entering a text or tapping a virtual textbox/a text key, to select the calibration area from the image, for example, entering "hair" on a display interface of the image shown in FIG. 5C.

In step S103, obtaining a feature parameter corresponding to the calibration area from a preset segmentation model.

The preset segmentation model includes a classifier formed through deep learning. Then analyzing the calibration area by using the classifier, to obtain the feature parameter corresponding to the calibration area.

The feature parameter is used to describe a feature of the calibration area, including a static feature and/or a dynamic feature. The static feature is a feature parameter presented in or extracted from an existing image, such as a static feature of hair extracted from 3 existing images. The dynamic feature is a procedural parameter formed applicable to different changes, different depths of field and/or different coverings, such as procedural parameters of dynamic changes of the hair extracted from images of different backgrounds, different positions, wearing a hat or not, or the like.

In step S104, segmenting the image by using the feature parameter, to generate a segmentation result corresponding to the calibration area.

Figure 5D:

As shown in FIG. 5D, in a schematic diagram of the segmentation result, the hair used as the calibration area is usually shown by using a first color, and a non-calibration area can be shown by using a second color or by blurring. It may be understood that if the non-calibration area is not shown, a transparent color or a background color may be construed as the second color.

Optionally, after generating the segmentation result, deformation, discoloration and/or replacement processing may further be performed on the segmentation result.

It may be understood that precise hair segmentation provides a solid algorithm foundation for various products using hair as an operation object. After segmenting the calibration area, the segmentation result may further be processed. Herein, still using hair as an example, a hair style may be changed, for example and not limited to, from straight hair to curly hair; or hair may be dyed, for example, by solid-color dyeing, multicolor highlight dyeing and multicolor bleaching and dyeing. Herein, the segmentation result may also be replaced, for example, by changing short hair to long hair.

Besides, through discoloration, deformation or/and replacement processing, performing a virtual clothes change on a figure of the image may further provide a technical support for a virtual reality (Virtual Reality, VR).

The image processing method provided in an embodiment of this disclosure, using a feature parameter obtained from the segmentation model, to segment the image to generate a segmentation result corresponding to a calibration area, has advantages of a high accuracy rate of segmentation and wide applicable scenarios. Therefore, this disclosure solves an existing problem with a reduced accuracy rate of estimating a hair area.

Figure 2:
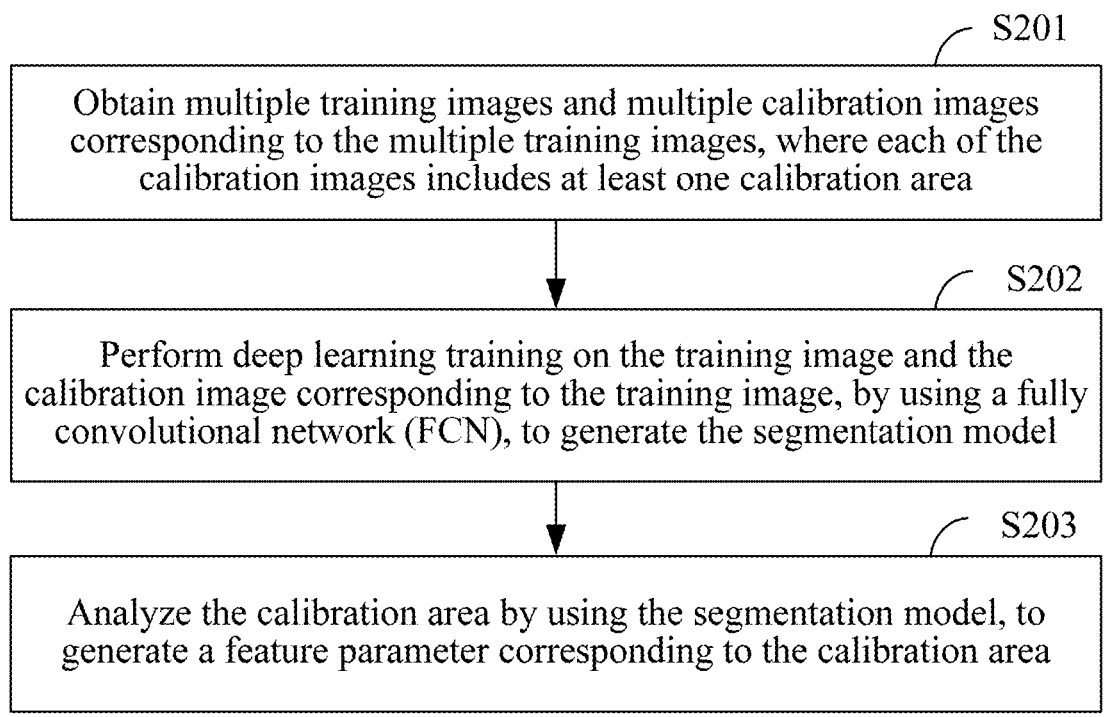
FIG. 2 is a schematic flow chart of an image processing method according to an embodiment of this disclosure.

FIG. 2 is a schematic flow chart of an image processing method according to an embodiment of this disclosure. The image processing method is usually executed in a server, used to generate a segmentation model and a parameter through deep learning training, to support obtaining a feature parameter corresponding to the calibration area from a preset segmentation model in step S103 in FIG. 1.

The image processing method includes the following steps S201 to S203:

In the step S201, obtaining multiple training images and obtaining multiple calibration images corresponding to the multiple training images, wherein each of the calibration images includes at least one calibration area.

Specifically, this step includes the following steps (1) to (5):

(1) Setting multiple acquisition criteria for the training image and/or the calibration image.

Using hair as an example, acquisition criteria corresponding to hair include but are not limited to: a hair style, a color, light intensity, a zoom scale, and/or definition. It may be understood that for different calibration images, the acquisition criterion may also be different by performing an adaptability adjustment. For example, an acquisition criterion using an eye as a calibration image may further include shape and/or color. For another example, an acquisition criterion using a nose as a calibration image may further include height and/or shape.

(2) Acquiring a person image according to the multiple acquisition criteria as the training image. For example, one training image is shown in FIG. 5A.

(3) Selecting at least one calibration area in the training image, to generate the calibration image corresponding to the training image. For example, one calibration image is shown in FIG. 5B, where a first color may usually be used to represent the calibration area, and a second color represents a non-calibration area. The non-calibration area may be an area in the training image which does not belong to the calibration area.

In addition, one calibration area is usually selected, such as hair. Multiple calibration areas may also be selected at a time, for example, including hair, an eyebrow and a beard. Alternatively, select a general or broader area, such as a face.

(4) Selecting an image processing manner. The image processing manner includes but not limiting to: jitter processing, barrel distortion, pincushion distortion, left-handed rotation, right-handed rotation, lateral stretching, longitudinal stretching, brightness attenuation, reversing, and/or cutting, and the like.

It may be understood that to make the segmentation model more robust, the multiple training images and the multiple corresponding calibration images should attempt to include situations in various scenarios. The multiple training images and the multiple corresponding calibration images under situations in various scenarios may be acquired by image acquisition, or may be supplemented at a later time point by means of data conversion. Such training set may be used more widely, thus improving the robustness of the segmentation model.

(5) Perform the same image processing manner on the training image and the calibration image corresponding to the training image, to obtain doubled training data.

It may be understood that image processing aims to obtain doubled data at a low cost, thereby avoiding onerous image calibration work. By extending a training set, an accuracy rate of an algorithm is improved.

In the step S202, performing deep learning training on the multiple training images and the multiple calibration images corresponding to the multiple training images, by using a fully convolutional network (FCN), to generate the segmentation model.

Specifically, this step includes the following steps (1) to (8):

(1) Define a configuration file of the segmentation model by using a deep learning platform.

The deep learning platform, using an open source platform Caffe as an example, calculates weight parameters in a configuration file by using a rule of gradient descent. The deep learning may include two processes: forward propagation and backward feedback, has a great self-learning capability, can evaluate the learning result in real time, and is extremely robust.

(2) Initialize weight parameters of each layer in the configuration file, where the weight parameters are convolution kernel parameters of at least one convolutional layer and at least one fully-connected layer.

A conventional deep learning network generally uses a convolutional neural Network (Convolutional Neural Network, CNN) type network model, where the CNN type network model includes several convolutional layers, a small amount of sample layers and the last few fully-connected layers. For example, the famous VGG network is a typical CNN type network, including 13 convolutional layers, 5 sample layers, 3 fully-connected layers and a regression layer. In this step, using a VGG configuration file as an example, the configuration file, each layer of which includes at least one of: a convolutional layer or a fully-connected layer.

(3) Perform convolutional calculation on the training image by using the weight parameters, to obtain a feature image of the training image.

For example, the VGG network has a great image identification capability, being applicable to classifying images. In one embodiment, convert the fully-connected layer in the VGG network into the convolutional layer, and then calculate probability statistics of input data by the regression layer, and perform a logical regression calculation on a classification of main objective of an entire image. However, because the input data turns to image data, the regression layer of the last layer performs a classification and regression calculation of each pixel, to obtain a classification attribute of each pixel. In another embodiment, a pixel attribute only includes two classifications: for example, hair and background. In this embodiment, a last segmentation result can characterize a hair area range, that is: obtain a feature image of the training image.

(4) Compare the feature image with the calibration image, and perform regression statistics, to obtain an error value.

Thus, the forward propagation process of the deep leaning platform is completed. Besides, an additional explanation is that, in a test procedure, perform forward propagation only.

(5) Correct the weight parameters in the configuration file according to the error value, to generate the segmentation model.

Specifically, this step includes: calculate offset values of the error value for the input data of each layer in the configuration file layer by layer; correct the weight parameters of the layer after the offset values are added to the weight parameters of the layer. Thus, the backward feedback process of the deep leaning platform is completed.

(6) After completing an iteration, determine whether the error value is less than a preset value.

The forward propagation and the backward feedback are put together to be considered as an iteration. It may be understood that after iteration of each time, the weight parameter is corrected, and the error value tends to decrease. That is: calculate and correct the weight parameter in the configuration file by using a rule of gradient descent.

(7) Continue the deep learning training when the error value is not less than the preset value, until an error value less than the preset value is generated.

(8) Complete the deep learning training when the error value is less than the preset value.

It may be understood that after iterations of a super large number of times, the error value no longer significantly decreases, and an input result of segmenting a network is almost consistent with a calibration image. That is: to generate the segmentation model.

In step S203, analyzing the calibration area by using the segmentation model, to generate a feature parameter corresponding to the calibration area.

The segmentation model, may be understood as a classifier formed through deep learning. Then analyze the calibration area by using the classifier, to output the feature parameter corresponding to the calibration area.

The feature parameter is used to describe a feature of the calibration area, including a static feature and/or a dynamic feature. The static feature is a feature parameter presented in or extracted from an existing image. Taking hair as an example, a static feature of hair may be extracted from multiple (for example, 2, 3, or 5) existing images. The dynamic feature is a procedural parameter formed applicable to different changes, different depths of field and/or different coverings. Taking hair as an example, a procedural parameter of a dynamic change of hair may be extracted from multiple images of different backgrounds, different positions, or wearing a hat or not, or the like.

The image processing method provided in the embodiment of this disclosure, using a feature parameter obtained from the segmentation model, segmenting the image to generate a segmentation result corresponding to a calibration area, of which the segmentation model performs deep learning robustly, has a high accuracy rate to segment by using the segmentation model, and has wide applicable scenarios. Therefore, this disclosure improves the computer-related image processing technology and solves the existing problems.

Figure 3:
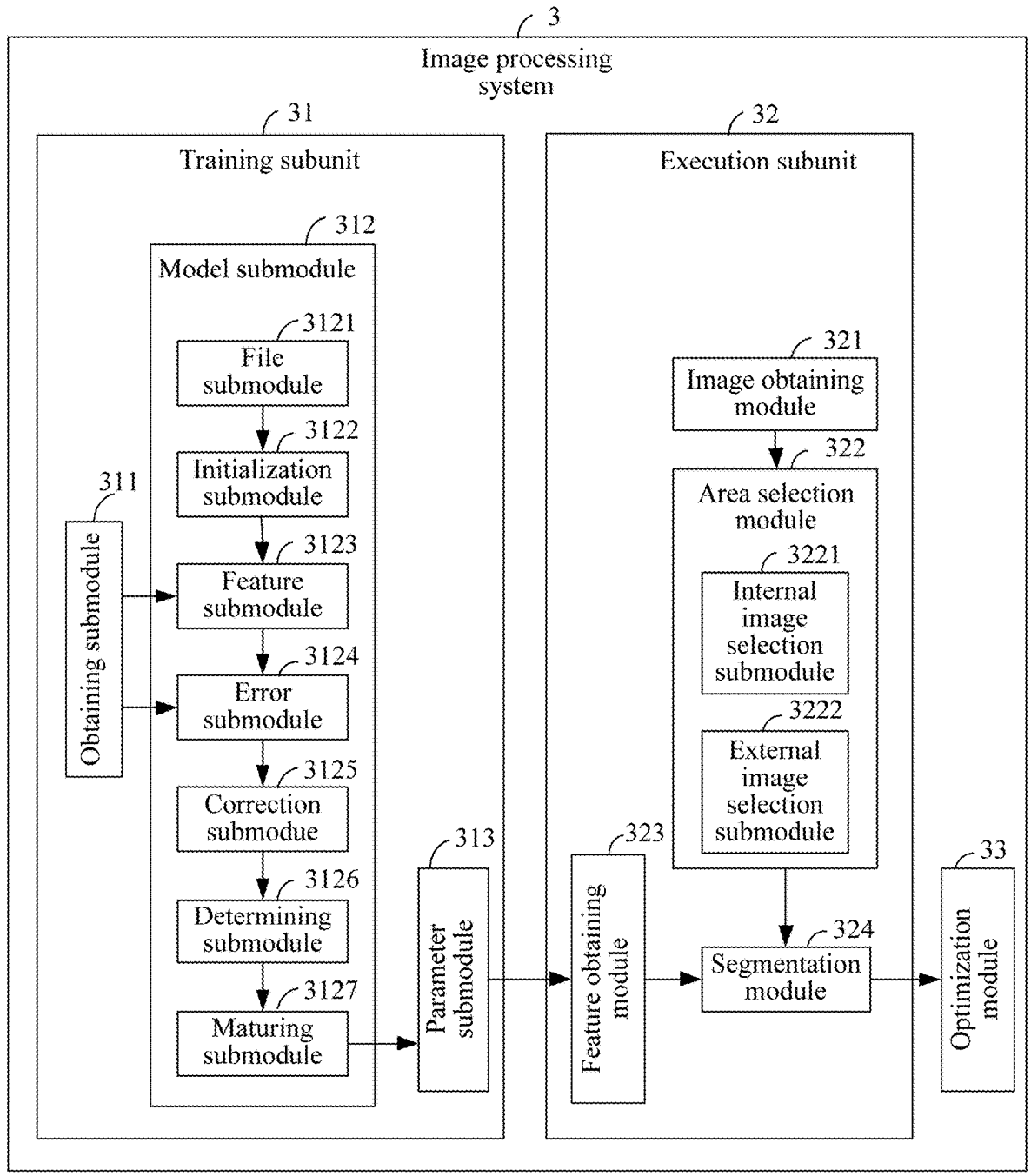
FIG. 3 is a schematic module diagram of an image processing system according to an embodiment of this disclosure.

Referring to FIG. 3, FIG. 3 is a schematic basic module diagram of an image processing system according to an embodiment of this disclosure.

The image processing system 3 includes a training subunit 31 and an Execution subunit 32. In one embodiment, the training subunit 31 may be executed in a server, configured to build the segmentation model. The execution subunit 32 may be executed in the server, or in another embodiment, the execution subunit 32 may be executed in a terminal, configured to execute an image processing task based on the above segmentation model.

Specifically, the training subunit 31 is considered as a training module, including: an obtaining submodule 311, a model submodule 312 and a parameter submodule 313.

The obtaining submodule 311 is configured to obtain a training image and a calibration image corresponding to the training image, wherein the calibration image includes at least one calibration area;

It may be understood that to obtain a training set including massive training images and calibration images, the training set may be supplemented by setting multiple acquisition criteria for the training images and/or the calibration images, and by performing data conversion on the existing training set in later period. Such training set may be used more widely, and the segmentation model obtained is more robust.

Using hair as an example of the calibration image, acquisition criteria corresponding to the calibration image include but are not limited to: a hair style, a color, light intensity, a zoom scale, and/or definition. It may be understood that for different calibration images, the acquisition criterion may be different by performing an adaptability adjustment. For example, an acquisition criterion using an eye as a calibration image may further include shape and/or color, and an acquisition criterion using a nose as a calibration image may further include height and/or shape.

The image processing manner, including but not limiting to: jitter processing, barrel distortion, pincushion distortion, left-handed rotation, right-handed rotation, lateral stretching, longitudinal stretching, brightness attenuation, reversing, and/or cutting. It may be understood that image processing aims to obtain doubled data at a low cost, thereby avoiding onerous image calibration work. By extending a training set, an accuracy rate of an algorithm is improved.

A model submodule 312 is configured to perform, deep learning training on the training image and the calibration image corresponding to the training image, by using a fully convolutional network (FCN), to generate the segmentation model.

Specifically, the model submodule 312, including:

A file submodule 3121 is configured to definite the configuration file of the segmentation model by using a deep learning platform.

The deep learning platform may be based on an existing deep learning open source platform or other deep learning platforms with adjustments and modification suitable for this disclosure. The deep learning may include two processes: forward propagation and backward feedback, has a great self-learning capability, and a real-time test may be performed on a learning outcome thereof, resulting in an extremely high robustness.

An Initialization submodule 3122 is configured to initialize one or more weight parameter of each layer in the configuration file, where the weight parameters are convolution kernel parameters of a convolutional layer and a fully-connected layer.

It may be understood that the VGG network has a great image identification capability, being applicable to classifying images. In one embodiment, take the following configuration file as an example, a VGG configuration file may be used as the configuration file, and each layer in the configuration file includes at least one of: a convolutional layer or a fully-connected layer.

A feature submodule 3123 is configured to perform a convolutional calculation on the training image by using the weight parameters, to obtain a feature image of the training image.

In one embodiment, the process of the convolutional calculation includes: convert the fully-connected layer in the VGG network into the convolutional layer, and then calculate probability statistics of input data performed on by the regression layer, and perform a logical regression calculation on a classification of main objective of an entire image. However, because the input data turns to image data, the regression layer of the last layer performs a classification and regression calculation of each pixel, to obtain a classification attribute of each pixel. In another embodiment, a pixel attribute only falls to two classifications: for example, hair and background. In this embodiment, the last segmentation result can characterize a hair area range, that is: obtain a feature image of the training image.

An error submodule 3124 is configured to compare the feature image with the calibration image, and perform regression statistics, to obtain an error value.

Thus, the forward propagation process of the deep leaning platform is completed. Moreover, an additional explanation is that, in a test procedure, perform forward propagation only.

A correction submodule 3125 is configured to correct the weight parameters in the configuration file according to the error value, to generate the segmentation model.

Specifically, this correction procedure includes: calculate an offset value of the error value for the input data of each layer in the configuration file layer by layer; correct the weight parameter of the layer after the offset value is added to the weight parameter of the layer. Thus, the backward feedback process of the deep leaning platform is completed.

A determining submodule 3126 is configured to, after the completing an iteration, determine whether the error value is less than a preset value.

The forward propagation and the backward feedback are put together to be considered as an iteration. It may be understood that after iteration of each time, the weight parameter is corrected, and the error value tends to decrease. That is: calculate and correct the weight parameter in the configuration file by using a rule of gradient descent.

A maturing submodule 3127 is configured to: continue performing the deep learning training, until an error value less than the preset value is generated; when the error value is less than the preset value, complete the deep learning training and generate the segmentation model.

It may be understood that after iterations of a super large number of times, the error value no longer significantly decreases, and an input result of segmenting a network is almost consistent with a calibration image. That is: the segmentation model is generated.

A parameter submodule 313 is configured to analyze the calibration area by using the segmentation model, to generate a feature parameter corresponding to the calibration area.

In one embodiment, the execution subunit 32 may be used in a test after the training. The execution subunit 32 includes: an image obtaining module 321, an area selection module 322, a feature obtaining module 323 and a segmentation module 324.

The image obtaining module 321 is configured to obtain an image. The image includes but is no limited to an image of a person, scenery, an object, or the like. An image of at least one person is used as an example below, and the disclosure is not limited to an image of at least one person. An image as shown in FIG. 5C includes at least a head. The person image may be a half-length portrait or a full-length portrait, a frontal portrait or a side face portrait; an individual portrait or a group portrait, or the like.

An area selection module 322 is configured to select a calibration area of the image. Use an example of selecting hair as the calibration area to explain. Other part of the image may be selected as the calibration area, for example and not limited to, a beard, an eyebrow, an eye, a nose, a mouth, clothes, or a pair of glasses, or the like.

The area selection module 322 includes an internal image selection submodule 3221, being configured to tap in the image to obtain a tap point, extract a feature from the tapped point, and extend to an area comprising a second feature similar to the feature, to generate the calibration area to be selected. The are selection module 322 may also include an external image selection submodule 3222, being configured to enter a text or tap a virtual key/a text key to select the calibration area.

A feature obtaining module 323 is configured to read, from a preset segmentation model, a feature parameter corresponding to the calibration area.

The preset segmentation model may include a classifier formed through the deep learning. Then the feature obtaining module 323 may analyze the calibration area by using the classifier, to obtain the feature parameter corresponding to the calibration area. The feature parameter is used to describe a feature of the calibration area, including a static feature and/or a dynamic feature. The static feature is a feature parameter presented in or extracted from an existing image, such as a static feature of hair extracted from 3 existing images. The dynamic feature is a procedural parameter formed applicable to different changes, different depths of field and/or different coverings, such as a procedural parameter of a dynamic change of hair extracted from images of different backgrounds, different positions, wearing a hat or not, or the like.

A segmentation module 324 is configured to segment the image by using the feature parameter, to generate a segmentation result corresponding to the calibration area.

As shown in FIG. 5D, in a schematic diagram of the segmentation result, the hair used as the calibration area is usually shown by using a first color, and a non-calibration area can be shown by using a second color or by blurring. It may be understood that if the non-calibration area is not shown, a transparent color or a background color may be construed as the second color.

In one embodiment, the image processing system 3 may include an optimization module 33, being configured to perform deformation or discoloration processing on the segmentation result.

It may be understood that precise hair segmentation provides a solid algorithm foundation for a serial of products using hair as an operation object. After segmenting the calibration area, the segmentation result may further be processed. Using hair as an example again, perform a hair style change herein, such as changing straight hair to curly hair; dye hair, such as a solid-color dye, a multicolor highlight dye and a multicolor bleach and dye. The segmentation result may also be replaced, such as changing short hair to long hair.

Besides, through discoloration, deformation or/and replacement processing, performing a virtual clothes change on a figure in the image may further provide a technical support for a virtual reality (Virtual Reality, VR).

The image processing system provided in the embodiment of this disclosure, using a feature parameter obtained from the segmentation model, to segment the image to generate a segmentation result corresponding to a calibration area, has advantages of a high accuracy rate of segmentation and wide applicable scenarios. Therefore, this disclosure solves an existing problem with a reduced accuracy rate of estimating a hair area.

Figure 4:
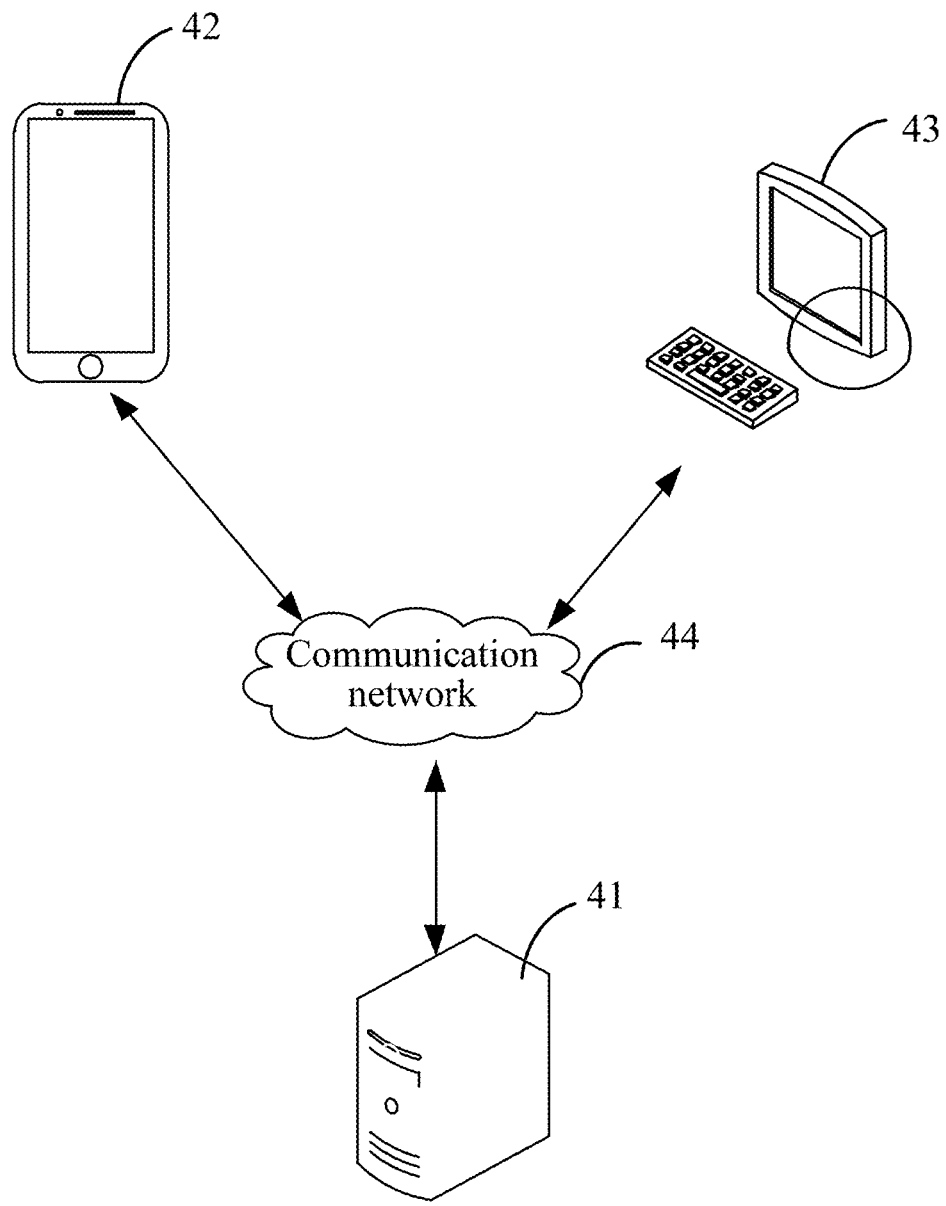
FIG. 4 is a schematic disclosure environment diagram of an image processing system and processing method according to an embodiment of this disclosure.

Referring to FIG. 4, FIG. 4 is a schematic application environment diagram of an image processing system and processing method according to an embodiment of this disclosure. The image processing task may be described as below.

A training period is performed by a server 41, and a relative configuration file is used to assign network structure information, data set information and a training parameter. A training function of the Caffe may be used to perform a network training, to obtain a final training result: a .caffemodel model file. In one embodiment, the .caffemodel model file may include the segmentation model and the feature parameters corresponding to the calibration areas.

It should be noted that because computational complexity of the deep learning platform is great, the server 41 generally supports two implementations: an implementation using a central processing unit (CPU) and an implementation using a graphic processing unit (GPU). It may be understood that GPU has more professional hardware calculation resource comparing with CPU, and a calculating speed of GPU is several times or even dozens of times higher than that of CPU. Because the VGG classification network has high precision and high computational complexity, GPU is more suitable to be used in such calculation. When calculating by the GPU, hair segmentation can achieve a quasi-real time effect, i.e., very close to real-time effect. In another embodiment, a CPU may be used in such calculation, and it takes several seconds for the CPU to complete the calculation. A comparison of specific performances is shown in the following tables.

Table 1 shows algorithm time consuming of the CPU and the GPU in different resolutions.

| Processor | Resolution | | |
| --- | --- | --- | --- |
|  | 513 | 233 | 153 |
| CPU(Intel i7-4770) | 13.5 s | 2.7 s | 1.0 s |
| GPU(GeForce GTX 780 Ti) | 0.25 s | 0.052 s | 0.022 s |

A testing period is performed by a terminal device 42, or 43 or the server 41, and a test interface (usually is an interface of Python or Matlab) is used to load a .caffemodel model file and generate a network model in a memory. The input data (usually is one or more image files) is assigned as test images, and an output data of a network is obtained as the segmentation result.

A communication network 44 is configured to transfer the segmentation model, the feature parameter, and/or the segmentation result among the server 41 and the terminal devices 42 and 43.

The image processing system and processing method provided in the embodiments of this disclosure belong to a same conception. Although an emphasized point of each embodiment is different, a design philosophy is consistent. In addition, in a certain embodiment, a part that is not described in detail may be referred to a detailed description of the full text of the specification, and details are not described herein.

An embodiment of this disclosure further provides an image processing system, including a processor and a memory storing a program, the processor executing the program stored in the memory to execute the above image processing method.

In conclusion, although the present disclosure discloses the preferred embodiments as above, the above preferred embodiments are not intended to limit the present disclosure. Any modification, equivalent replacement, or improvement made by persons of ordinary skill in the art without departing from the spirit and scope of the present disclosure should fall within the scope of the present disclosure. Therefore, the protection scope of the present disclosure is subject to the appended claims.

What is claimed is:

1. A method for image processing by a first device and a second device, comprising:
    obtaining, by a second device comprising a second memory and a second processor in communication with the second memory, a training image and a selection image corresponding to the training image, wherein the selection image comprises at least one selection area;
    performing, by the second device using a fully convolutional network (FCN), deep learning training on the training image and the selection image to generate a segmentation model;
    analyzing, by the second device, the at least one selection area by using the segmentation model to generate a feature parameter corresponding to the at least one selection area, the feature parameter comprising a static feature and a dynamic feature, the static feature extracted from multiple training images, and the dynamic feature comprising procedural parameters of dynamic changes;
    obtaining, by a first device comprising a first memory and a first processor in communication with the first memory, an image comprising a human head;
    selecting, by the first device, a selection area of the image;
    obtaining, by the first device from the segmentation model, the feature parameter corresponding to the selection area;
    segmenting, by the first device, the image by using the feature parameter, to generate a segmentation result corresponding to the selection area; and
    transforming, by the first device, the segmentation result as an operation object by performing deformation, color transformation, or replacement processing on the segmentation result.

2. The method according to claim 1, wherein the performing, by the second device using the FCN, the deep learning training on the training image and the selection image corresponding to the training image, to generate the segmentation model comprises:
    defining, by the second device, a configuration file of the segmentation model by using a deep learning platform;
    initializing, by the second device, weight parameters of each layer in the configuration file, wherein the weight parameters are convolution kernel parameters of a convolutional layer and a fully-connected layer;
    performing, by the second device, convolutional calculation on the training image by using the weight parameters, to obtain a feature image of the training image;
    comparing, by the second device, the feature image with the selection image, and performing regression statistics, to obtain an error value; and
    correcting, by the second device, the weight parameters in the configuration file according to the error value, to generate the segmentation model.

3. The method according to claim 2, wherein the correcting the weight parameters in the configuration file according to the error value, to generate the segmentation model comprises:
    calculating, by the second device, offset values of the error value for input data of each layer in the configuration file, wherein each layer comprises at least one of: the convolution layer or the fully-connected layer; and
    correcting, by the second device, the weight parameters by adding the offset values to the weight parameters.

4. The method according to claim 2, wherein after the correcting the weight parameters in the configuration file according to the error value, to generate the segmentation model, the method further comprises:
    determining, by the second device, whether the error value is less than a preset value;
    when it is determined that the error value is less than a preset value, completing, by the second device, the deep learning training; and
    when it is determined that the error value is not less than a preset value, continuing, by the second device, the deep learning training until an error value less than the preset value is generated.

5. The method according to claim 1, wherein the obtaining the training image and the selection image corresponding to the training image comprises:
    acquiring, by the second device, a person image, as the training image; and
    selecting, by the second device, at least one selection area in the training image, to generate the selection image corresponding to the training image.

6. The method according to claim 5, wherein before the acquiring the person image, as the training image, the method further comprises:
    setting, by the second device, multiple acquisition criteria, wherein the acquisition criteria comprise at least one of:
        a hair style,
        a color,
        a light intensity,
        a zoom scale, or
        a definition; and
    the acquiring the person image as the training image comprises:
        acquiring, by the second device, the person image according to the multiple acquisition criteria.

7. The method according to claim 5, wherein after the selecting the at least one selection area in the training image, to generate the selection image corresponding to the training image, the method further comprises:
selecting an image processing manner, an image processing manner comprising at least one of:
jitter processing,
barrel distortion,
pincushion distortion,
left-handed rotation,
right-handed rotation,
lateral stretching,
longitudinal stretching,
brightness attenuation,
reversing, or
cutting; and
performing the image processing manner on the training image and the selection image corresponding to the training image, to obtain doubled training data.

8. The method according to claim 1, wherein the selecting the selection area of the image comprises:
selecting, by the first device, the selection area from the image by at least one of:
tapping in the image; or
entering a text or by tapping a text or by using a virtual key.

9. A system for image processing, the system comprising:
a memory storing instructions; and
a processor in communication with the memory, wherein, when the processor executes the instructions, the processor is configured to cause the system to:
obtain a training image and a selection image corresponding to the training image, wherein the selection image comprises at least one selection area,
perform, using a fully convolutional network (FCN), deep learning training on the training image and the selection image to generate a segmentation model,
analyze the at least one selection area by using the segmentation model to generate a feature parameter corresponding to the at least one selection area, the feature parameter comprising a static feature and a dynamic feature, the static feature extracted from multiple training images, and the dynamic feature comprising procedural parameters of dynamic changes,
obtain an image comprising a human head,
select a selection area of the image,
obtain, from a segmentation model, a feature parameter corresponding to the selection area,
segment the image by using the feature parameter, to generate a segmentation result corresponding to the selection area, and
transform the segmentation result as an operation object by performing deformation, color transformation, or replacement processing on the segmentation result.

10. The system according to claim 9, wherein, when the processor is configured to cause the system to preform, by using the FCN, the deep learning training on the training image and the selection image corresponding to the training image, to generate the segmentation model, the processor is configured to cause the system to:
define a configuration file of the segmentation model by using a deep learning platform;
initialize weight parameters of each layer in the configuration file, wherein the weight parameters are convolution kernel parameters of a convolutional layer and a fully-connected layer;
perform convolutional calculation on the training image by using the weight parameters, to obtain a feature image of the training image;
compare the feature image with the selection image, and performing regression statistics, to obtain an error value; and
correct the weight parameters in the configuration file according to the error value, to generate the segmentation model.

11. The system according to claim 9, wherein, when the processor is configured to cause the system to select the selection area of the image, the processor is configured to cause the system to:
select the selection area from the image by at least one of:
tapping;
entering a text;
tapping a text; or
using a virtual key.

12. A non-transitory computer readable storage medium storing instructions, wherein the instructions, when executed by a processor, cause the processor to:
obtain a training image and a selection image corresponding to the training image, wherein the selection image comprises at least one selection area,
perform, using a fully convolutional network (FCN), deep learning training on the training image and the selection image to generate a segmentation model,
analyze the at least one selection area by using the segmentation model to generate a feature parameter corresponding to the at least one selection area, the feature parameter comprising a static feature and a dynamic feature, the static feature extracted from multiple training images, and the dynamic feature comprising procedural parameters of dynamic changes,
obtain an image comprising a human head,
select a selection area of the image,
obtain, from a segmentation model, a feature parameter corresponding to the selection area,
segment the image by using the feature parameter, to generate a segmentation result corresponding to the selection area, and
transform the segmentation result as an operation object by performing deformation, color transformation, or replacement processing on the segmentation result.

13. The non-transitory computer readable storage medium according to claim 12, wherein, when the instructions cause the processor to preform, by using the FCN, the deep learning training on the training image and the selection image corresponding to the training image, to generate the segmentation model, the instructions cause the processor to:
define a configuration file of the segmentation model by using a deep learning platform;
initialize weight parameters of each layer in the configuration file, wherein the weight parameters are convolution kernel parameters of a convolutional layer and a fully-connected layer;
perform convolutional calculation on the training image by using the weight parameters, to obtain a feature image of the training image;
compare the feature image with the selection image, and performing regression statistics, to obtain an error value; and correct the weight parameters in the configuration file according to the error value, to generate the segmentation model.

14. The non-transitory computer readable storage medium according to claim 12, wherein, when the instructions cause the processor to select the selection area of the image, the instructions cause the processor to:
 select the selection area from the image by at least one of:
  tapping;
  entering a text;
  tapping a text; or
  using a virtual key.

* * * * *